United States Patent [19]
El-Ibiary et al.

[11] Patent Number: 6,116,089
[45] Date of Patent: Sep. 12, 2000

[54] METHOD AND APPARATUS FOR IDENTIFYING DEFECTS IN A ROTATING MACHINE SYSTEM

[75] Inventors: Yehia M. El-Ibiary, Simpsonville, S.C.; Richard L. Sarkisian, Granger, Ind.

[73] Assignee: Reliance Electric Technologies, LLC, Thousand Oaks, Calif.

[21] Appl. No.: 08/908,488

[22] Filed: Aug. 7, 1997

[51] Int. Cl.[7] .............................. G01H 1/00; G01M 7/00
[52] U.S. Cl. ................................. 73/593; 73/660
[58] Field of Search ........................... 73/593, 599, 600, 73/602, 597, 598, 660, 661, 659, 577; 702/35, 33, 34

[56] References Cited

U.S. PATENT DOCUMENTS

| | | | |
|---|---|---|---|
| 4,262,538 | 4/1981 | Otawara | 73/593 |
| 4,408,294 | 10/1983 | Imam | 73/593 |
| 5,187,434 | 2/1993 | Ando | 73/593 |
| 5,533,400 | 7/1996 | Gasch et al. | 73/593 |

*Primary Examiner*—Helen C. Kwok
*Attorney, Agent, or Firm*—Patrick S. Yoder; John J. Horn; William R. Walbrun

[57] ABSTRACT

A system for detecting defects in a rotating machine system includes a sensor such as an accelerometer coupled to the machine system for detecting vibrations of a rotating element. Output of the accelerometer is transmitted, preferably via a network data link to a monitoring/control circuit. The monitoring/control circuit analyzes the vibration data to develop a normal vibration profile for the machine system during a normal operating phase. The normal vibration profile is stored in a memory circuit for later reference. During subsequent operation of the machine system, the monitoring/control circuit cyclically analyzes vibration data to develop actual vibration profiles. The actual vibration profiles are compared to the normal vibration profile and, where variations between the profiles exceed preset tolerances, the circuit provides an indication of a malfunction or defect in the machine system. The technique is particularly well suited to conveyor systems such as drum pulleys and the like in which cracks, breaks and other defects can result in unexpected failure and maintenance.

20 Claims, 4 Drawing Sheets

METHOD AND APPARATUS FOR IDENTIFYING DEFECTS IN A ROTATING MACHINE SYSTEM

BACKGROUND OF THE INVENTION

1. Field of the Invention

The present invention relates to the field of rotating machinery and the monitoring of such machinery for defects, breakages and the like. More particularly, the invention relates to a system for monitoring a pulley assembly or other rotating machine element and for detecting a change in the operating condition of the assembly by reference to a vibration or load profile.

2. Description of the Related Art

A variety of industrial, mining and other applications exist for rotating machinery. Such machinery includes drive systems and material handling systems, such as conveyors and the like. Many such rotating machinery systems are periodically subjected to considerable loading that may result in latent defects or, in severe cases, catastrophic failure. In many cases, eventual failure is the result of continued cycling of machine elements in which defects have already occurred. Such defects may including cracks, tears, or other deformations in the mechanical structures that will eventually fail, even under normal working stresses. Because the failure of such machinery may lead to expensive repairs and down time, it is important to locate latent defects as early as possible to permit scheduling of necessary repairs before failures occur.

Failures due to latent defects are particularly problematic in conveyor and drive systems. Such systems, omnipresent in many industrial, mining, timber products, shipping and power generating facilities, to name just a few, are necessary for the transport of raw and processed materials. The systems typically include pulleys and rollers that directly contact the transported material, or that support conveyor belts or chains on which the transported material is deposited. In many applications, loads are quite substantial and the machinery must remain functional virtually at all times. Failure of elements of the machinery, particularly of pulleys and rollers, results in unscheduled repairs to bring the machinery back into service. Where the pulleys and rollers support a conveyor belt or chain, the belt may need to be removed to give access to the failed component, resulting in additional down time and expense.

Certain serious or obvious defects in rotating machine systems may be detectable by operations personnel based upon auditory or visual inspection. However, many defects escape such detection due to their latent nature or location. In conveyor systems in particular, certain rotating machinery may be located on booms, towers and the like, where physical inspection is very difficult. While some latent defects may be discoverable upon close inspection during machine servicing, for much critical machinery, such servicing is generally rare and must be minimized. Moreover, many latent defects are not readily discoverable even upon close visual inspection, without recourse to special equipment which is not typically available in industrial and other settings.

There is a need, therefore, for an improved technique for the early detection of defects in rotating machine systems. In particular, there is a need for a system for detecting such defects that can be applied on existing structures as well as new installations, and that can provide a reliable indication of a potential defect during operation of the machinery.

SUMMARY OF THE INVENTION

The present invention provides a novel technique for detecting defects in rotating machine systems that responds to these needs. The technique may be applied on a wide range of machinery, including conveyor pulleys and the like. Equipment for implementing the technique may be designed into new systems, or may be readily retrofitted to existing machinery. The equipment may be configured to operate independently of other control systems in the application, or may be networked with other process control components to provide reporting of possible defects to a central or area controller. Maintenance and operations personnel are thus provided with a mechanism for monitoring for defects during normal operation of the machinery, without the need to physically access the machinery or to stop production for auditory or visual inspection.

Thus, in accordance with a first aspect of the invention, an apparatus is provided for detecting defects in a rotating machine system. The system includes a shaft supporting a machine element in rotation. The apparatus includes a sensor, a memory circuit, and a signal processing circuit. The sensor is coupled to the machine system and detects vibration of the machine system. The sensor generates an output signal representative of the machine system vibration. The memory circuit is configured to store a normal vibration profile of the machine system. The signal processing circuit is coupled to the sensor and to the memory circuit, and is configured to derive an actual vibration profile from the output signal. The signal processing circuit compares the actual vibration profile to the normal vibration profile and, generates a defect signal based upon a predetermined relationship between the normal and actual vibration profiles.

In accordance with a particularly preferred form of the invention, an apparatus is provided for detecting defects in a pulley system including a fixed shaft supported on a machine frame and a pulley rotatably supported on the shaft. A vibration sensor is coupled to the pulley system and detects vibrations of the pulley system. A memory circuit stores a normal vibration profile of the pulley system. A signal processing circuit is coupled to the sensor and to the memory circuit. The signal processing circuit generates an actual vibration profile from output of the vibration sensor, compares the actual and normal vibration profiles, and generates a defect signal based upon a predetermined relationship between the profiles.

The apparatus provided by the invention is particularly well suited to implementation in networked monitoring and control systems. In particular, a network interface circuit may be configured to the receive the output signal from the vibration sensor and to transmit the output signal to the signal processing circuit via network data link.

In accordance with another aspect of the invention, a method is provided for detecting defects in a rotating machine system. In accordance with the method, a sensor is coupled to the machine system and is configured to generate a parameter signal representative of a operating parameter of the machine system during rotation of a rotating member. A normal vibration profile is stored in a memory circuit. The parameter signal produced by the sensor is monitored during operation of the machine system, and an actual vibration profile is generated based upon the monitored parameter signal. The normal vibration profile is then compared to the actual vibration profile. A defect signal is generated based upon a predetermined relationship between the normal and actual vibration profiles. In a particularly preferred embodiment, the parameter signal is monitored during a normal phase of operation of the machine system and the information thus gathered is used to generate the normal vibration profile stored in the memory circuit.

BRIEF DESCRIPTION OF THE DRAWINGS

The foregoing and other advantages of the invention will become apparent upon reading the following detailed description and upon reference to the drawings in which.

DETAILED DESCRIPTION OF SPECIFIC EMBODIMENTS

Figure 1:
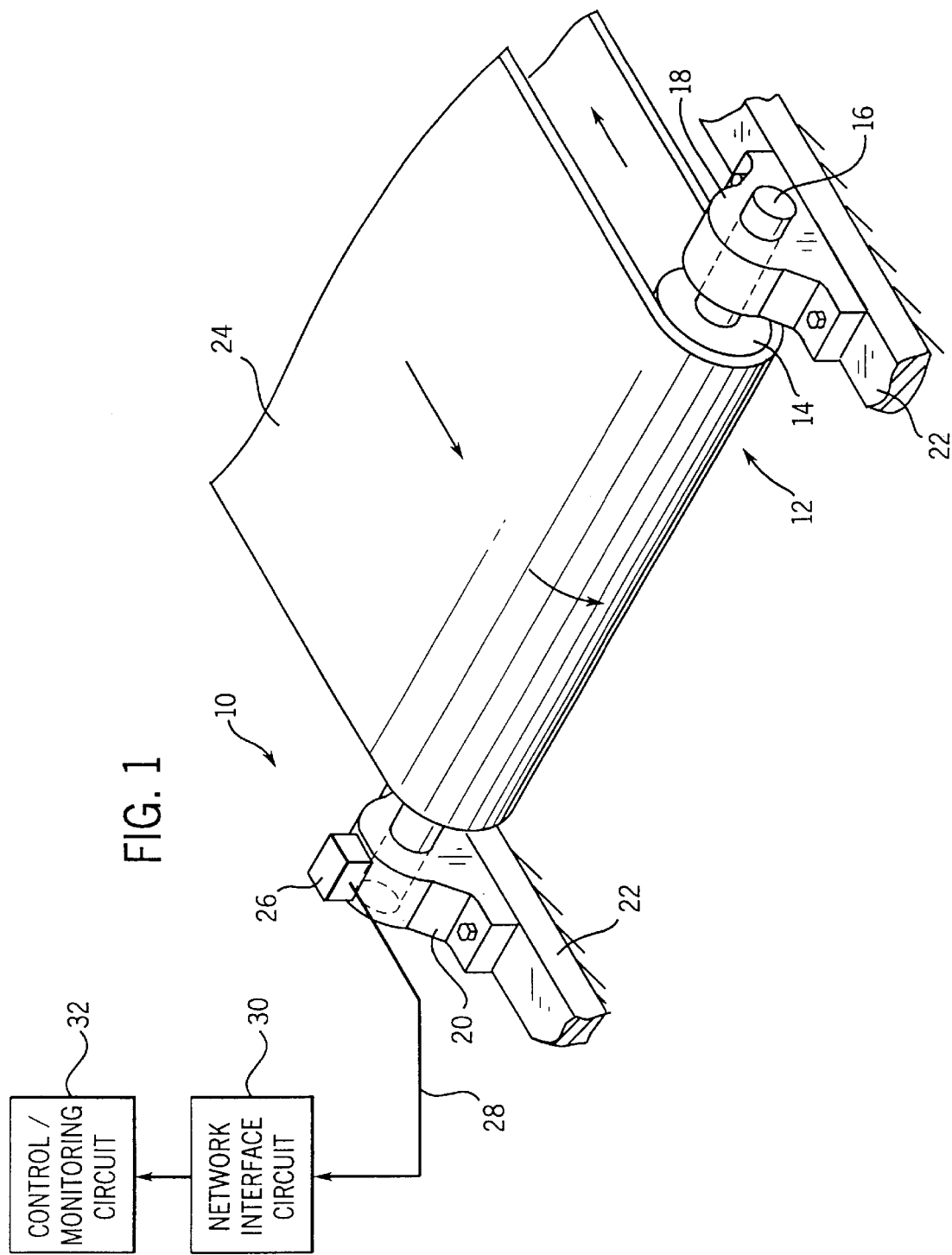
FIG. 1 is a perspective view of a portion of a rotating machine system including a conveyor belt and a pulley, instrumented for detection of defects in accordance with the invention.

Turning now to the drawings, and referring first to FIG. 1, a defect detection and monitoring system, designated generally by the reference numeral 10, is illustrated as installed with a rotating machine system 12. In the embodiment illustrated in FIG. 1, the rotating machine system 12 includes a drum pulley 14 mounted on a rotating shaft 16. Pulley 14 and shaft 16 are supported by bearings 18 and 20 at either end of shaft 16. Bearings 18 and 20 are, in turn, rigidly supported on a machine frame, represented generally at reference numeral 22. In the particular embodiment illustrated in the figures, rotating machine system 12 enables a conveyor belt 24 to be moved about pulley 14 for material handling purposes and the like. It should be noted, however, that rotating machine system 12 may be of various configurations, including both live and dead shaft pulley systems, idler rollers, conveyors or chains and so forth.

Figure 2:
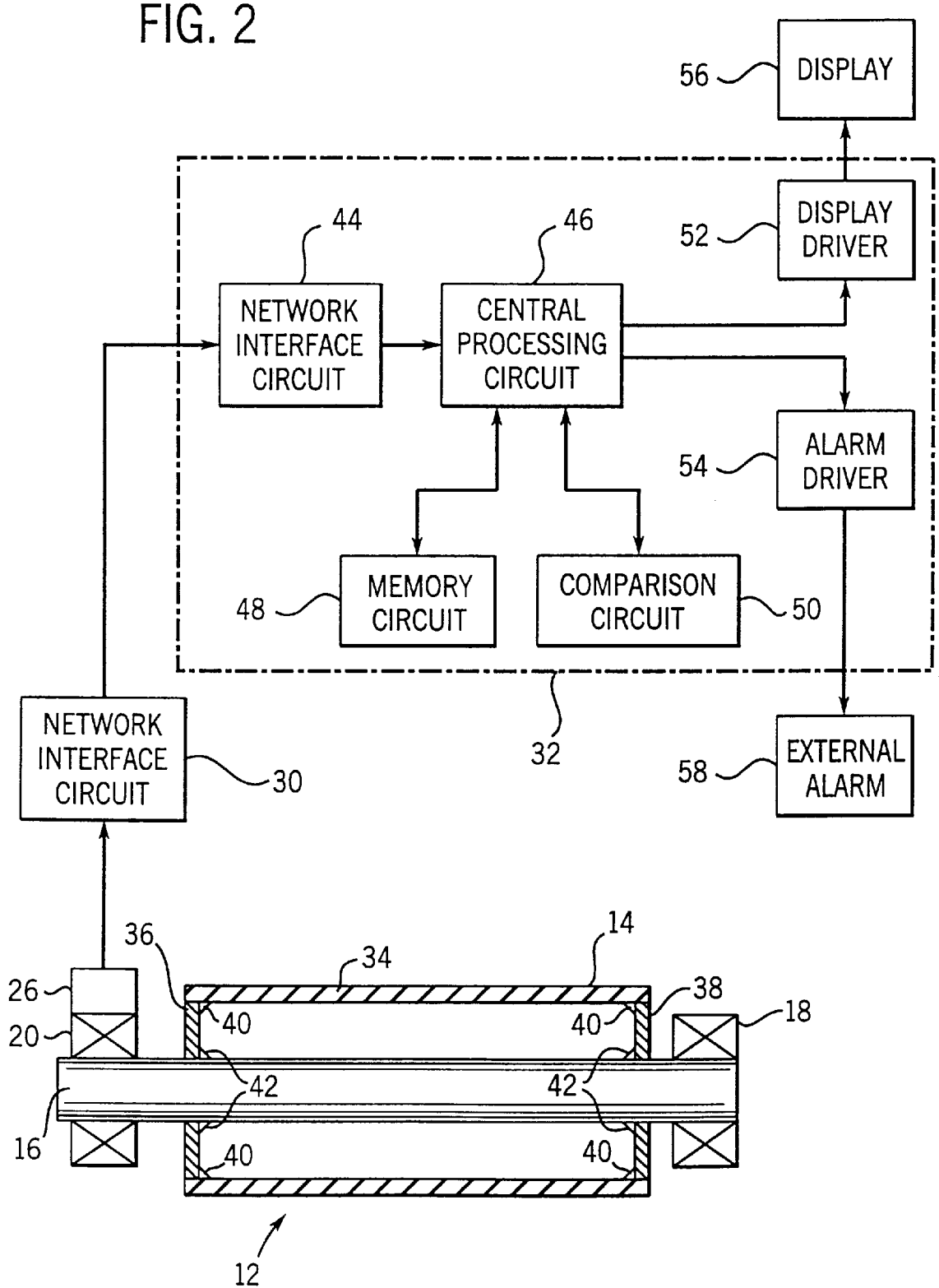
FIG. 2 is a diagrammatical representation of exemplary circuitry included in the defect detection system illustrated in FIG. 1.

System 10 further includes an accelerometer unit 26 secured to one of the bearing housings (see bearing 20 in FIGS. 1 and 2). Accelerometer unit 26 may be of any suitable type, such as a unit commercially available from Reliance Electric Industrial Company, Dodge Division, under the commercial designation "EZ Link". Accelerometer unit 26 detects movement of bearing 20 under loading exerted by pulley 14 and shaft 16, and converts this movement into electrical output signals in a manner generally known in the art. Output signals from accelerometer unit 26 are transmitted along a data link 28 to a network interface circuit 30. In general, network interface circuit 30 receives output signals from accelerometer unit 26 and performs any signal conditioning that may be required on the output signal. Network interface circuit 30 may be of any suitable type, such as a flexible input/output interface circuit available commercially from the Allen-Bradley Company of Milwaukee, Wisconsin under the commercial designation "KFD".

Network interface circuit 30 is, in turn, coupled to a control/monitoring circuit 32. The operation of control/monitoring circuit 32 will be described in greater detail below. In general, however, control/monitoring circuit 32 preferably collects input signals from a number of machine systems or nodes (not represented), including machine system 12, and processes feedback signals from the machine systems to monitor and control operation of the systems with respect to rotating machine system 12. Control/monitoring circuit 32 polls network interface circuit 30 for the conditioned output signals of accelerometer unit 26 in accordance with a preset communications protocol. Circuit then analyzes the output signals to generate vibration profiles, and monitors the vibration profiles to provide an indication of defects which may develop in the rotating machine system.

FIG. 2 illustrates diagrammatically certain elements of control/monitoring circuit 32, as well as points at which circuit 32 may detects in a typical pulley system. In particular, as illustrated in FIG. 2, rotating machine system 12 includes a pulley 14 comprising a drum-like central portion 34 mounted on end disks 36 and 38. End disks 36 and 38 are solidly secured to central portion 34 by weldments 40 extending in a corner region where central portion 34 joins disks 36 and 38. Moreover, end disks 36 and 38 are solidly secured to shaft 16 by similar weldments 42. Pulley 14 and shaft 16 therefore rotate as a unit supported by bearings 18 and 20. While a wide range of defects may be detected by the procedure described below, of particular interest in pulley systems of the type illustrated in the figures are cracks and other defects of central portion 34, end disks 36 and 38, and in weldments 40 and 42. Under certain loading conditions, latent defects present in these elements may result in catastrophic failure. Thus, it is particularly advantageous to detect such latent defects as early as possible in order to predict possible failure and schedule servicing of these elements.

Vibrations resulting from a cyclic loading of machine system 12 are converted to electric signals by accelerometer unit 26. Network interface circuit 30, which may be local to machine system 12 or located at some distance therefrom, receives the output signals from accelerometer unit 26. Interface circuit 30 then communicates conditioned output signals to control/monitoring circuit 32.

As illustrated in FIG. 2, circuit 32 includes a network interface circuit 44, a central processing circuit 46, a memory circuit 48, a comparison circuit 50, a display driver circuit 52, and an alarm driver circuit 54. Some or all of the circuits may be provided in a single controller unit, or may be configured as appropriate coding in a general purpose or application-specific microprocessor.

Within control/monitoring circuit 32, conditioned output signals from accelerometer unit 26 are received by network interface circuit 44. Network interface circuit 44 preferably includes circuitry for conversion of signals from network interface circuit 30 into a digitized form, and may perform additional filtering or signal conditioning functions as required by central processing circuit 46. Filtered and digitized signals from interface circuit 44 are transmitted to central processing circuit 46. Central processing circuit 46, which preferably includes an appropriately programmed microprocessor, receives the signals from interface circuit 44 and analyzes vibrations of machine system 12 as described more fully below. Memory circuit 48 is coupled to central processing circuit 46 and, in addition to a cyclical control routine executed by central processing circuit 46, stores a normal vibration profile for machine system 12 in a digitized term. Comparison circuit 50, which is also preferably defined by appropriate coding of a microprocessor, executes a comparison of normal and actual vibration profiles for machine system 12 as called for central processing circuit 46.

Based upon this comparison, central processing circuit 46 outputs data for providing graphical, numerical or other representations of the normal and actual vibration profiles, in addition to other operating parameter information via display driver circuit 52. Display driver circuit 52 converts this output data into a form as required for display 56.

Display 56 may include a conventional output or display device, such as a computer monitor, strip-chart recorder, printer or the like. In addition to outputting information via display driver circuit 52, central processing circuit 46 is coupled to an alarm driver 54. Alarm driver 54, which will typically include a solid-state switch and associated relay hardware, commands external alarm 58. External alarm 58 may provide either an auditory or a visual alarm, or both, indicative of a defect detected in machine system 12. Both display 56 and external alarm 58 will typically be located at an operator's station or control room in a remote location from machine system 12.

Figure 3:
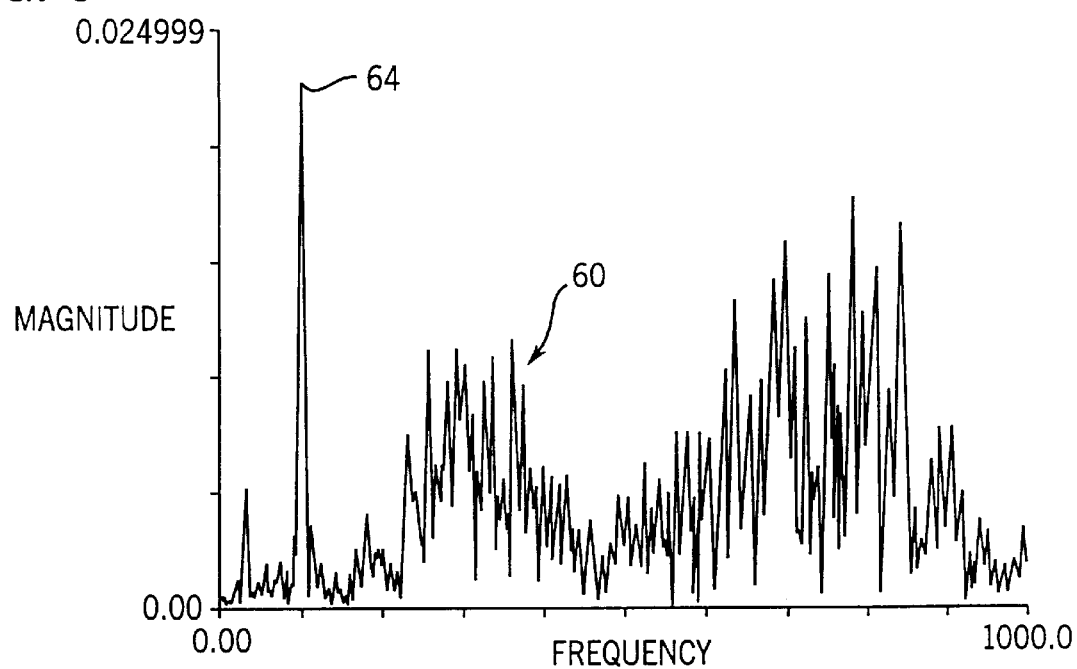
FIG. 3 is a graphical representation of an exemplary vibration profile produced by the apparatus and circuitry illustrated in FIGS. 1 and 2.
Figure 4:
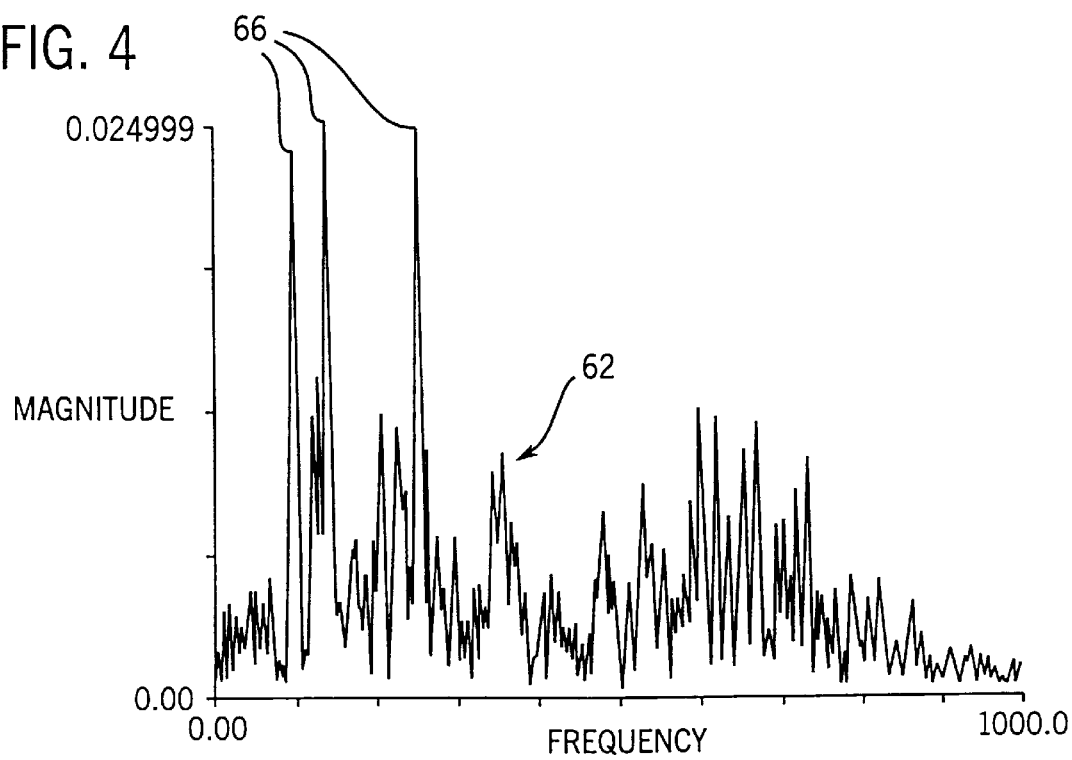
FIG. 4 is a graphical representation of an exemplary abnormal vibration profile produced by the installation of FIGS. 1 and 2 wherein the pulley system is cracked.

Based upon output signals produced by accelerometer unit 26, control/monitoring circuit 32 generates vibration profiles as illustrated in FIGS. 3 and 4. Such vibration profiles may be generated in accordance with various techniques as will be appreciated by those skilled in the art. In general, such profiles are generated by analyzing output signals from accelerometer unit 26 to determine the magnitude of vibrations at particular frequency bandwidths. FIG. 3 illustrates an exemplary normal vibration profile 60 for a rotating pulley system of the type illustrated in FIGS. 1 and 2. FIG. 4, on the other hand, illustrates an exemplary actual vibration profile 62 for the pulley system wherein a weldment between an end disk and a central portion of a drum pulley has been cracked under loading. As shown in FIGS. 3 and 4, both normal and actual vibration profiles, 60 and 62, include a number of peaks and valleys extending over a range of frequencies from 0 to 1000 Hertz. In normal vibration profile 60, particular peaks will develop depending on the physical configuration and loading of machine system 12, such as a large peak 64 at a frequency of approximately 100 Hertz. While this profile may become altered slightly through loading of machine system 12, is has been found that an identifiable vibration profile can be developed. As will be appreciated by those skilled in the art, particular peaks and valleys for particular frequency bandwidths can be identified, and windows or ranges of acceptable variations for those bandwidths can be specified based upon observation and analysis of the normal vibration profiles during running of machine system 12.

As illustrated in FIG. 4, defects in an element of machine system 12 result in substantial change in the vibration profile. In particular, as illustrated in FIG. 4, machine system 12 develops clear peaks or valleys well outside normal operating tolerances at identifiable frequencies. In particular, in the actual vibration profile 62 shown in FIG. 4, large additional peaks are developed at frequencies of approximately 140 and 250 Hertz. By comparing the normal and actual vibration profiles, control/monitoring circuit 32 detects such peaks as an indication of an abnormal or defect condition.

Figure 5:
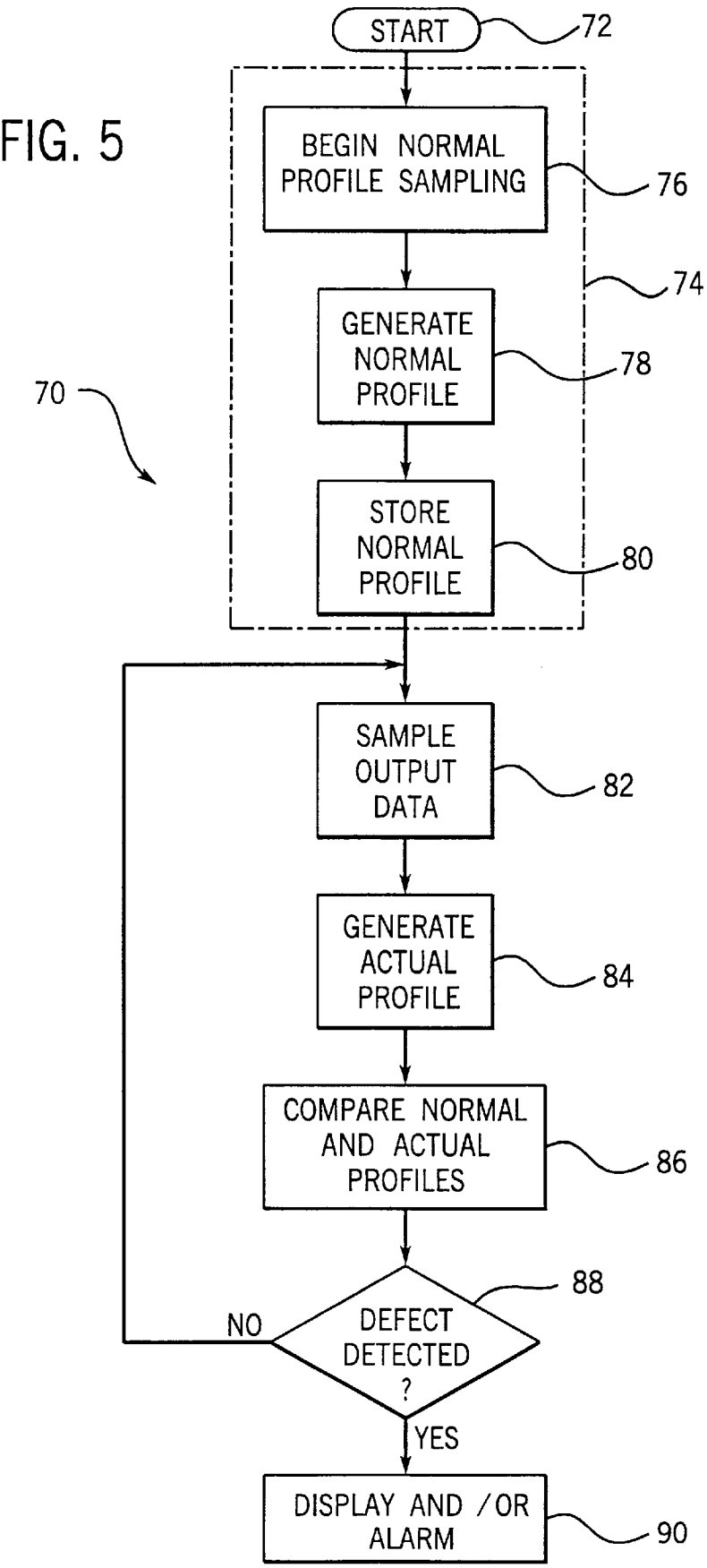
FIG. 5 is a flow chart illustrating exemplary control logic for producing and storing a normal vibration profile for a rotating machine system and for detecting defects based upon the normal vibration profile.

FIG. 5 represents exemplary steps in control logic 70 for generating a normal vibration profile and for comparing the normal vibration profile to an actual vibration profile to detect defects in a rotating machine system. Control logic 70 begins at step 72 where the logical steps are entered, such as during a cyclical control routine executed by central processing circuit 46. From step 72 central processing circuit 46 enters into a normal profile definition segment, represented generally by reference numeral 74. During this segment of operation, central processing circuit 46 receives conditioned output signals from accelerometer unit 26 and samples these output signals as indicated at step 76. Based upon these output signals, central processing circuit 46 generates a normal vibration profile as indicated at step 78. As indicated above, central processing circuit preferably analyzes output from accelerometer unit 26 to determine approximate magnitudes of vibration or movement at a specific bandwidth intervals over a range of frequencies. In addition, at step 78 a central processing circuit 46 may employ various averaging or statistical methods to determine acceptable tolerance ranges for vibrations at the specific bandwidths to define the normal vibration profile. At step 80, central processing circuit 46 stores a digitized or numerical version of the normal vibration profile in memory circuit 48. From step 80, central processing circuit 46 exits routine 74 and enters into a normal operating sequence at step 82. As indicated at step 82, central processing circuit 46 continues to sample output data from accelerometer unit 26. At step 84, based upon the sampled output data, central processing circuit 46 generates an actual vibration profile in a manner similar to that employed to generate the normal vibration profile at step 78. At step 86, comparison circuit 50 is called upon to execute a comparison of magnitudes of movement for corresponding bandwidths of the actual and normal vibration profiles. Based upon this comparison, central processing circuit 46 analyzes at step 88 whether the magnitude of vibrations at corresponding bandwidths of the actual vibration profile have risen or fallen beyond tolerances set for variations from the normal vibration profile. If significant variations have been detected at step 88, central processing circuit 46 continues to step 90 where output signals are developed for display driver 52 and/or alarm driver 54, notifying operation's personnel of a possible defect in machine system 12. If, on the other hand, actual vibration data is determined to be within allowable tolerances at step 88, central processing circuit 46 loops back to step 88 and continues to cyclically sample and analyze vibration data from accelerometer unit 26.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. An apparatus for detecting defects in a rotating machine system, the system including a shaft supporting a machine element in rotation, the apparatus comprising:

a sensor coupled to the machine system for detecting vibration of the machine system and generating an output signal representative thereof;

a memory circuit for storing a normal vibration profile of the machine system and at least one tolerance amplitude at an identified frequency of the profile; and a signal processing circuit coupled to the sensor and to the memory circuit, the signal processing circuit being configured to derive an actual vibration profile from the output signal, to compare the actual vibration profile to the normal vibration profile to identify a vibration level above the tolerance amplitude for the identified frequency, and to the generate a defect signal when the amplitude at the identified frequency is above the tolerance amplitude.

2. The apparatus of claim 1, wherein the at least one tolerance amplitude is based upon an amplitude of the normal vibration profile at the identified frequency.

3. The apparatus of claim 1, further comprising a network interface circuit coupled to the sensor and to the signal processing circuit, the network interface circuit configured to receive the output signal and to transmit the output signal to the signal processing circuit via a network data link.

4. The apparatus of claim 1, further comprising an operator interface coupled to the signal processing circuit, the operator interface being configured to display the normal and actual vibration profiles of the machine system.

5. The apparatus of claim 1, wherein the signal processing circuit is configured to monitor the output signal of the machine system during a normal phase of operation to generate the normal vibration profile based upon characteristics of the output signal during the normal phase of operation, and to store the normal vibration profile in the memory circuit.

6. The apparatus of claim 1, wherein the shaft is fixed with respect to a machine support and the machine element is supported for rotation on the shaft by at least one bearing assembly, and wherein the sensor generates the output signal based upon loading of the shaft during rotation of the machine element.

7. The apparatus of claim 6, wherein the machine element includes a central portion coupled to and supported by first and second end portions, the end portions being rotatably supported on the shaft by first and second bearing assemblies, and wherein the sensor is configured to sense changes in vibratory patterns due at least to defects in joints between the first and second end portions and the central portion.

8. An apparatus for detecting defects in a pulley system, the system including a fixed shaft supported on a machine frame and a pulley rotatably supported on the shaft by at least one bearing, the apparatus comprising:

a vibration sensor coupled to the pulley system, the sensor detecting vibration of the pulley system and generating an output signal representative thereof;

a memory circuit for storing a normal vibration profile of the pulley system and at least one tolerance amplitude at an identified frequency of the profile; and a signal processing circuit coupled to the sensor and to the memory circuit, the signal processing circuit being configured to generate an actual vibration profile from the output signal, to compare the actual vibration profile to the normal vibration profile to identify a vibration level outside the tolerance amplitude for the identified frequency and to generate a defect signal when the amplitude at the identified frequency is above the tolerance amplitude.

9. The apparatus of claim 8, wherein the at least one tolerance amplitude is based upon an amplitude of the normal vibration profile at the identified frequency.

10. The apparatus of claim 8, further comprising a network interface circuit coupled to the sensor and to the signal processing circuit, the network interface circuit configured to receive the output signal and to transmit the output signal to the signal processing circuit via a network data link.

11. The apparatus of claim 8, further comprising an operator interface coupled to the signal processing circuit, the operator interface being configured to display the normal and actual vibration profiles of the pulley system.

12. The apparatus of claim 8, wherein the signal processing circuit is configured to monitor the output signal during a normal phase of operation of the pulley system, to generate the normal vibration profile based upon characteristics of the output signal during the normal phase of operation, and to store the normal vibration profile in the memory circuit.

13. The apparatus of claim 8, wherein the pulley includes a central portion coupled to and supported by first and second end portions, the end portions being rotatably supported on the shaft by first and second bearing assemblies, and wherein the sensor is configured to sense changes in vibratory patterns due at least to defects in joints between the first and second end portions and the central portion.

14. A method for detecting defects in a rotating machine system, the system including a rotating member supported by at least one bearing, the method comprising the steps of:

(a) coupling a sensor to the machine system, the sensor being configured to generate a parameter signal representative of an operating parameter of the machine system during rotation of the rotating member;

(b) storing a normal vibration profile and at least one tolerance amplitude at an identified frequency of the profile in a memory circuit;

(c) monitoring the parameter signal during operation of the machine system;

(d) generating an actual vibration profile based upon the monitored parameter signal;

(e) comparing the normal vibration profile to the actual vibration profile at the identified frequency to determine whether the amplitude of the actual vibration profile at the identified frequency is above the tolerance amplitude; and (f) generating a defect signal when the amplitude at the identified frequency is above the tolerance amplitude.

15. The method of claim 14, comprising the further steps of monitoring the parameter signal during a normal phase of operation of the machine system, generating the normal vibration profile based thereon, and identifying the tolerance amplitude from the normal vibration profile.

16. The method of claim 14, wherein the operating parameter is vibration of the machine system resulting from cyclic loading of the system during rotation of the rotating member.

17. The method of claim 14, wherein the sensor is an accelerometer and the parameter signal is an output signal of the accelerometer, characteristics of the parameter signal being affected by movement of the resulting from loading of the machine system.

18. The method of claim 14, wherein the machine system includes a fixed shaft and at least one bearing assembly, the bearing assembly supporting the rotating member for rotation on the shaft.

19. The method of claim 18, wherein the sensor is fixed to the shaft.

20. The method of claim 14, wherein the sensor is coupled to a network interface circuit, the network interface circuit receiving the parameter signal and transmitting the parameter signal to a signal processing circuit, and wherein steps (d), (e) and (f) are performed by the signal processing circuit.

* * * * *